(12) United States Patent
Kim et al.

(10) Patent No.: US 11,658,328 B2
(45) Date of Patent: *May 23, 2023

(54) SUPERWIDE POUCH TYPE SECONDARY BATTERY WITH DOUBLE TABS

(71) Applicant: SK INNOVATION CO., LTD., Seoul (KR)

(72) Inventors: Dong Ju Kim, Daejeon (KR); Jin Go Kim, Daejeon (KR); Bo Hyun Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,368

(22) Filed: Jan. 13, 2022

(65) Prior Publication Data

US 2022/0209278 A1 Jun. 30, 2022

Related U.S. Application Data

(63) Continuation of application No. 16/848,606, filed on Apr. 14, 2020, now Pat. No. 11,276,873.

(30) Foreign Application Priority Data

Apr. 15, 2019 (KR) .................. 10-2019-0043771
Dec. 2, 2019 (KR) .................. 10-2019-0157980

(51) Int. Cl.
  *H01M 50/136* (2021.01)
  *H01M 10/04* (2006.01)
  (Continued)

(52) U.S. Cl.
  CPC ... *H01M 10/0413* (2013.01); *H01M 10/0459* (2013.01); *H01M 50/136* (2021.01);
  (Continued)

(58) Field of Classification Search
  CPC ......... H01M 10/0413; H01M 10/0459; H01M 50/136; H01M 50/178; H01M 50/55; H01M 50/553
  See application file for complete search history.

(56) References Cited

U.S. PATENT DOCUMENTS

| | | | | |
|---|---|---|---|---|
| 2008/0292962 A1* | 11/2008 | Jung | ............... | H01M 50/543 429/211 |
| 2012/0028105 A1* | 2/2012 | Kumar | ............... | H01M 4/133 429/152 |
| 2013/0143109 A1* | 6/2013 | Kim | ............... | H01M 10/0413 429/178 |

FOREIGN PATENT DOCUMENTS

EP  3460879 A1  3/2019

OTHER PUBLICATIONS

Extended European Search Report for the European Patent Application No. 22168403.8 issued by the European Patent Office dated Jul. 27, 2022.

* cited by examiner

*Primary Examiner* — Jane J Rhee
(74) *Attorney, Agent, or Firm* — IP & T Group LLP

(57) ABSTRACT

Provided is a superwide pouch type secondary battery comprising an electrode assembly including a cathode plate, an anode plate, and a separator; a pouch surrounding the electrode assembly; and electrode tabs connected to both ends of the electrode assembly and protruding outward of the pouch, wherein the electrode tabs connected to the both ends of the electrode assembly include one or more cathode tabs and anode tabs, respectively, and width of battery cell is more than 4 times longer than height of battery cell such that loading efficiency of the pouch type secondary battery into a vehicle and an energy density may be improved without increasing an internal electrode.

7 Claims, 3 Drawing Sheets

(51) Int. Cl.
*H01M 50/55* (2021.01)
*H01M 50/553* (2021.01)
*H01M 50/178* (2021.01)
(52) U.S. Cl.
CPC ......... *H01M 50/178* (2021.01); *H01M 50/55* (2021.01); *H01M 50/553* (2021.01)

SUPERWIDE POUCH TYPE SECONDARY BATTERY WITH DOUBLE TABS

CROSS-REFERENCE TO RELATED APPLICATIONS

This application is a continuation of U.S. patent application Ser. No. 16/848,606 filed on Apr. 14, 2020, which claims priority under 35 U.S.C. § 119 to Korean Patent Application No. 10-2019-0043771, filed on Apr. 15, 2019, and No. 10-2019-0157980, filed on Dec. 2, 2019, in the Korean Intellectual Property Office, the disclosure of which is incorporated herein by reference in its entirety.

TECHNICAL FIELD

The following disclosure relates to a pouch type secondary battery, and more particularly, to a superwide pouch type secondary battery in which a width between electrode tabs is wide.

BACKGROUND

A secondary battery has been prominent as a power source of an electric vehicle, a hybrid electric vehicle, and the like, that have been proposed as a solution for air pollution of an existing gasoline vehicle, a diesel vehicle, or the like, that uses a fossil fuel.

Meanwhile, in order to load the secondary battery into the vehicle, it has been required to improve an energy density and solve a space constraint. Particularly, as a battery pack is disposed on a floor of the vehicle for space efficiency, a wide battery cell whose length at edges between electrode tabs is much larger than that at edges where the electrode tabs are positioned has been required.

However, in a wide or superwide battery cell, a length between the electrode tabs is increased, such that an internal resistance of the battery cell is increased, resulting in an increase in power consumption, and a temperature difference is large for each region of the battery cell, resulting in a decrease in performance of the battery cell and a lifespan of the battery. Therefore, a technology capable of decreasing the internal resistance of the battery cell and implementing a large width of the battery cell has bee demanded.

SUMMARY

An embodiment of the present invention is directed to providing a superwide pouch type secondary battery capable of having a superwide width implemented without increasing an internal resistance of a battery cell.

Further, an embodiment of the present invention is directed to providing an electrode tab structure and a connection structure between an electrode assembly and an electrode tab that are required in designing a superwide pouch type secondary battery.

In one general aspect, a pouch type secondary battery includes: an electrode assembly including a cathode plate, an anode plate, and a separator; a pouch surrounding the electrode assembly; and electrode tabs connected to both ends of the electrode assembly and protruding outward of the pouch, wherein the electrode tabs connected to the both ends of the electrode assembly include two or more cathode tabs and anode tabs, respectively, and Wc/Hc>4 in which Hc is a length of a battery cell at edges in a first direction of the battery cell to which the electrode tabs are connected and Wc is a length of the battery cell at edges in a second direction of the battery cell except for protrusion lengths of the electrode tabs, the second direction being perpendicular to the first direction. In addition, preferably, Wc/Hc>5 and more preferably, Wc/Hc>7.

Both ends of edges of the cathode tab and the anode tab in the second direction may have a shape in which thicknesses thereof are gradually decreased in the first direction.

Sealing films for protecting the electrode tabs at the time of sealing the pouch may be disposed at connected portions to which the electrode tabs are connected, in a form in which the sealing films surround the electrode tabs, and the sealing films may be disposed in a form in which the sealing films surround the cathode tab and the anode tab, respectively.

The length of the battery cell at the edge of the second direction may be 300 mm or more, and the length of the battery cell at the edge of the first direction may be 70 mm or more.

$0.3 \text{ mm} < t1 < 1.5 \text{ mm}$ and $1.0 < t1/t2 < 2.0$ in which $t1$ is a thickness of the cathode tab and $t2$ is a thickness of the anode tab.

$0.3 < (Wt1+Wt2)/Hc < 0.6$ in which $Wt1$ is a width of the cathode tab and $Wt2$ is a width of the anode tab.

$0.4 < (Ws1+Ws2)/Hc < 1.2$ in which $Ws1$ is a width of a cathode tab sealing film surrounding the cathode tab and $Ws2$ is a width of an anode tab sealing film surrounding the anode tab.

$0.08 < Wsg/(Ws1+Ws2) < 0.32$ in which $Wsg$ is a distance between one end of the cathode tab sealing film surrounding the cathode tab and one end of the anode tab sealing film surrounding the anode tab.

A bent portion surrounding the electrode assembly may be formed at one edge of the pouch, and a sealing portion may be formed at the other edge of the pouch by bonding both ends of the pouch to each other.

In another general aspect, a battery module includes the pouch type secondary battery described above.

DETAILED DESCRIPTION OF EMBODIMENTS

Figure 1:
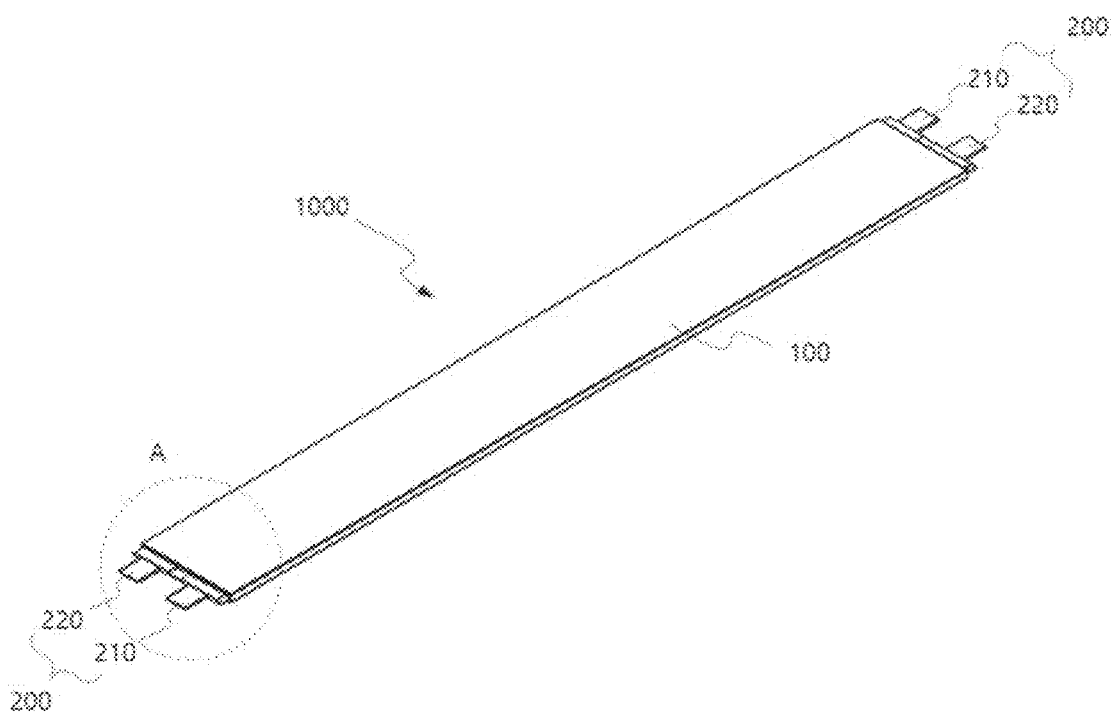
FIG. 1 is a perspective view of a pouch type secondary battery according to the present invention.

Advantages and features of exemplary embodiments of the present invention and a method of accomplishing them will become apparent from the following description of exemplary embodiments with reference to the accompanying drawings. However, the present invention is not limited to exemplary embodiments to be described later, but may be implemented in various different forms, these exemplary embodiments will be provided only in order to make the disclosure of the present invention complete and allow those skilled in the art to completely recognize the scope of the present invention, and the present invention will be defined by the scope of the claims. Throughout the specification, like reference numerals denote like elements.

In describing exemplary embodiments of the present invention, when it is determined that a detailed description for the known functions or components may unnecessarily obscure the gist of the present invention, the detailed description will be omitted. Further, terms to be described later are defined in consideration of functions in exemplary embodiments of the present invention and may be construed in different ways by intentions of users and operators. Therefore, these terms should be defined on the basis of the contents throughout the specification.

A battery module according to the present invention will be described with reference to the accompanying drawings.

Figure 2:
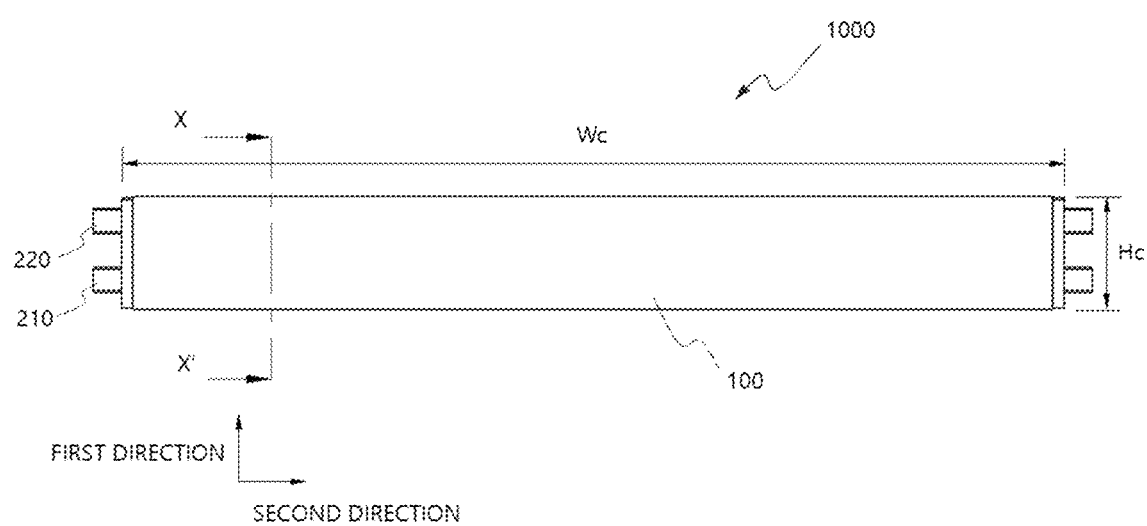
FIG. 2 is a plan view of the pouch type secondary battery according to the present invention.

FIGS. 1 and 2 are, respectively, a perspective view and a plan view of a pouch type secondary battery 1000 according to the present invention. Referring to FIGS. 1 and 2, the pouch type secondary battery 1000 according to the present invention includes a battery cell 100 in which an electrode assembly 110 including a cathode plate, an anode plate, and a separator is surrounded by a pouch 120; and electrode tabs 200 connected to both ends of the battery cell 100. Here, Wc/Hc>4 in which Hc is a length of the battery cell 100 at edges in a first direction of the battery cell 100 to which electrode tabs 200 are connected and Wc is a length of the battery cell 100 at edges in a second direction of the battery cell 100 except for protrusion lengths of the electrode tabs, the second direction being perpendicular to the first direction. In addition, the electrode tabs 200 of both ends include two or more cathode tabs 210 and anode tabs 220, respectively. And at least one cathode tab and at least one anode tab are positioned on each side.

Preferably, a length of the battery cell 100 at edges in a second direction of the battery cell 100 may be elongated to Wc/Hc>5, or more preferably Wc/Hc>7.

A general pouch type secondary battery has a width Wc corresponding to a length of approximately 300 mm, and may be usually designed to have a long width corresponding to a length up to about 600 mm. However, in the present invention, in order to implement maximum space efficiency and an optimum energy density in disposing a secondary battery on a floor of a vehicle, a superwide pouch type secondary battery having a low height Hc and a long width Wc capable of corresponding to a width of the vehicle is devised. In the present invention, a superwide secondary battery in which Wc/Hc>4 by designing the length (height) Hc at the edges in the first direction of the battery cell to which the electrode tabs 200 are connected to be in a range of 60 to 80 mm and designing the width Wc to be larger than 240 mm is proposed. As another exemplary embodiment, a superwide secondary battery in which Wc/Hc>4 by designing the length (height) Hc at the edges in the first direction of the battery cell to be in a range of 70 mm or more and designing the width Wc to be 300 mm or more is proposed. As still another exemplary embodiment, a superwide secondary battery in which Wc/Hc>7 by designing the length (height) Hc at the edges in the first direction of the battery cell to be in a range of 90 to 110 mm and designing the width Wc to be 630 mm or more is proposed. High capacity of the battery cells may be implemented by elongation of a length of the battery cell 100 at edges in a second direction of the battery cell 100, but a length between the electrode tabs is increased, such that an internal resistance of the battery cell and heat generation are increased. Therefore, problem of increasing of internal resistance and heat generation should be resolved.

In installing a battery pack on a lower portion of the vehicle, the battery pack may be configured by arranging several general secondary batteries having a width that is not long in a length direction so as to correspond to a width of the vehicle. However, in this case, the number of battery cells is increased, such that problems such as an increase in the number of components, a decrease in productivity, and a cost increase occur, and there is a limitation in implementing a high capacity of the battery cells. On the other hand, in the present invention, as described above, the superwide pouch type secondary battery capable of corresponding to the width of the vehicle is designed, such that the number of components may be decreased, productivity may be improved, a cost may be decreased, and an energy density may be improved using a superwide electrode assembly 110.

Meanwhile, a length of the electrode assembly 110 is increased, such that a conduction path between the electrode tabs 200 is also increased. Therefore, an internal resistance of the battery cell 100 is increased, such that power consumption is generated and an amount of heat generated in the battery cell 100 is increased. The present invention proposes a method of connecting two or more cathode tabs 210 and anode tabs 220 to both ends of the superwide pouch type secondary battery 1000 as an alternative to solve the problem as described above, and it is preferable to connect one cathode tab 210 and one anode tab 220 to each of the both ends of the superwide pouch type secondary battery 1000.

Figure 3A:
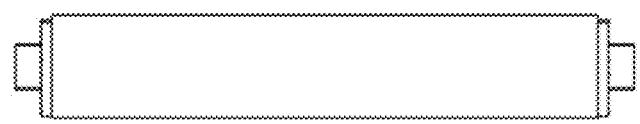
FIGS. 3A and 3B are plan views of a general pouch type secondary battery and a superwide pouch type secondary battery according to Comparative Example, respectively.
Figure 3B:

FIG. 3A illustrates a pouch type secondary battery having a general width. FIG. 3B illustrates a superwide pouch type secondary battery in which only one cathode tab or anode tab are connected to both ends as Comparative Example of the present invention.

Figure 4:
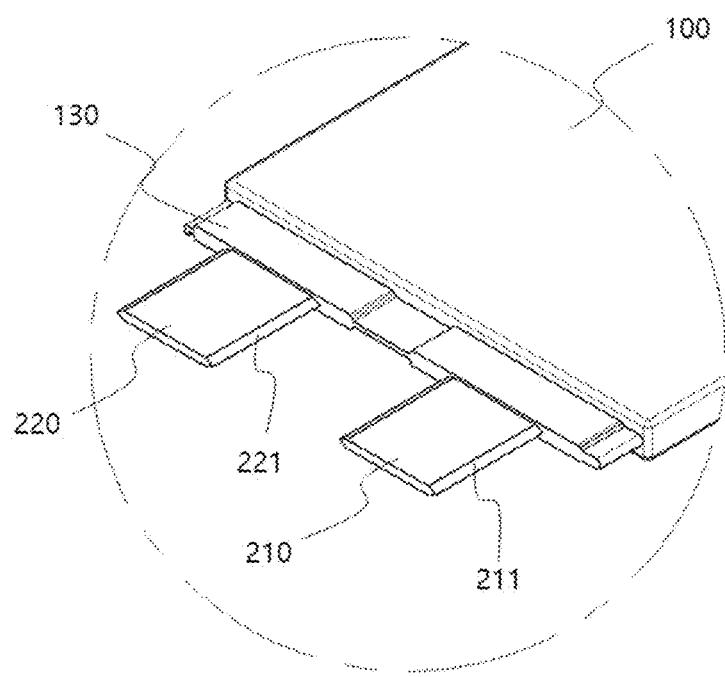
FIG. 4 is an enlarged view of part A of FIG. 1.

An effective method of decreasing the internal resistance is to increase the number and a thickness of electrode tabs, but when the number and the thickness of electrode tabs are increased, a sealing problem may occur at connected portions 130 connected to the battery cell 100. In order to solve such a problem, the present invention proposes cross-sectional shapes of the electrode tabs and a method of disposing sealing films 131 and 132 on connected portions 130 of the electrode tabs as a solution. FIG. 4 is an enlarged view of part A of FIG. 1. A cathode tab sealing film 131 and an anode tab sealing film 132 are disposed, respectively, on the connected portions 130 to which the cathode tab 210 and the anode tab 220 are connected, and both ends of edges of the cathode tab 210 and the anode tab 220 in the second direction have a shape in which thicknesses thereof are gradually decreased in the first direction. That is, at the connected portions 130, the cathode tab 210 and the anode tab 220 are surrounded by the sealing films 131 and 132, respectively, and a cathode tab edge 211 and an anode tab edge 221 positioned at sealing portions are formed to have gradually decreased thicknesses, such that sealing performance is excellent even though thicknesses of electrode tabs are increased.

Figure 5:
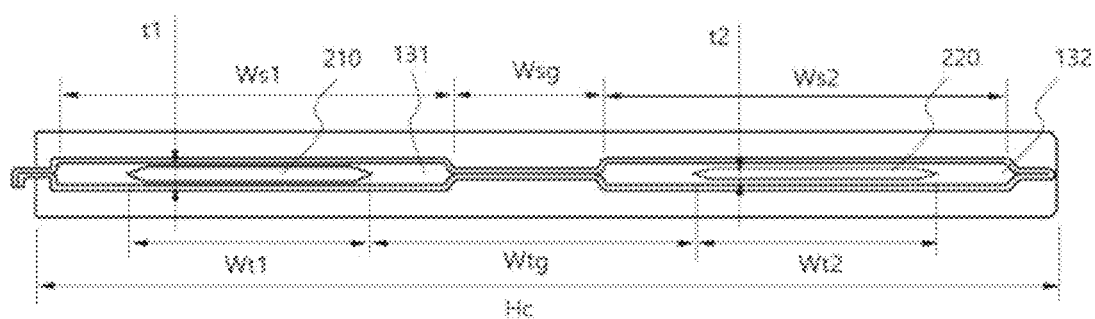
FIG. 5 is a front view of the pouch type secondary battery according to the present invention as viewed from an electrode tab direction.

FIG. 5 is a view of the pouch type secondary battery according to the present invention as viewed from an electrode tab direction in order to describe a design specification according to an exemplary embodiment. Referring to FIG. 5, as described above, in the superwide pouch type secondary battery according to the present invention, one cathode tab 210 and one anode tab 220 are connected to each of both ends of the battery cell, and the cathode tab 210 and the anode tab 220 are sealed by the pouch 120 in a state where they are surrounded by the cathode tab sealing film 131 and the anode tab sealing film, respectively.

Meanwhile, when a thickness of the cathode tab 210 is t1 and a thickness of the anode tab 220 is t2, it is preferable that 0.3 mm<t1<1.5 mm. In a case where the thickness of the cathode tab 210 is 0.3 mm or less, an internal resistance decrease effect is deteriorated, and in a case where the thickness of the cathode tab 210 is 1.5 mm or more, sealing performance is weakened. In addition, a thickness ratio between the cathode tab 210 and the anode tab 220 of the general pouch type secondary battery is 2 or more, while in the superwide pouch type secondary battery according to the present invention, it is preferable to set t1/t2 so that 1.0<t1/t2<2.0 by relatively decreasing the thickness of the cathode tab 210. Sealing performance may be improved without significantly increasing the internal resistance by setting the thickness of the cathode tab 210 to be small. Preferably, t1 and t1/t2 may be set so that 0.8 mm<t1<1.2 mm and 1.4<t1/t2<1.8, respectively, and more preferably, t1/t2 may be set so that 1.6<t1/t2<1.7.

Since a plurality of electrode tabs are connected to both ends of the battery cell, widths of the electrode tabs, widths of the sealing films, an insulation distance, and the like, need to be set in the ranges in which the above conditions are satisfied in order to secure sealing performance of the cathode tab 210 and the anode tab 220 that become thick while securing a minimum insulation distance between the cathode tab 210 and the anode tab 220.

It is preferable to set (Wt1+Wt2)/Hc so that 0.3<(Wt1+Wt2)/Hc<0.6 in which Wt1 is a width of the cathode tab 210 and Wt2 is a width of the anode tab 220, and it is more preferable to set (Wt1+Wt2)/Hc so that 0.4<(Wt1+Wt2)/Hc<0.6. In a case where the sum of the widths of the cathode tab 210 and the anode tab 220 is lower than the range described above, an increase in an internal resistance may not be prevented, and in a case where the sum of the widths of the cathode tab 210 and the anode tab 220 is higher than the range described above, it is difficult to secure sufficient sealing performance. In addition, it is preferable to set (Ws1+Ws2)/Hc so that 0.7<(Ws1+Ws2)/Hc<1.2 in which Ws1 is a width of the cathode tab sealing film 131 surrounding the cathode tab 210 and Ws2 is a width of the anode tab sealing film 132 surrounding the anode tab 220. In a case where (Ws1+Ws2)/Hc is smaller than 0.7, the electrode tab may not be sufficiently protected, and in a case where (Ws1+Ws2)/Hc is larger than 1.2, it is difficult to perform pouch sealing. It is more preferable to set (Ws1+Ws2)/Hc so that 0.7<(Ws1+Ws2)/Hc<0.9.

Meanwhile, in order to secure the minimum insulation distance between the cathode tab 210 and the anode tab 220, it is preferable to set Wtg/Hc so that Wtg/Hc>0.1 in which Wtg is a distance between the cathode tab 210 and the anode tab 220, and it is more preferable to set Wtg/Hc so that Wtg/Hc>0.12. In addition, is preferable to set Wsg/(Ws1+Ws2) so that 0.08<Wsg/(Ws1+Ws2)<0.32 in which Wsg is a distance between one end of the cathode tab sealing film 131 and one end of the anode tab sealing film 132, and it is more preferable to set Wsg/(Ws1+Ws2) so that 0.12<Wsg/(Ws1+Ws2)<0.30.

Table 1 illustrates exemplary experiment results for comparing a relationship between an increase in widths, thicknesses of tabs, and the number of tabs, and is a table in which internal resistances of battery cells of superwide pouch type secondary batteries (Comparative Examples) in which only one cathode tab or one anode tab is connected and superwide pouch type secondary batteries (Embodiment Examples) in which one cathode tab 210 and one anode tab 220 are connected to each of both ends are compared with each other while increasing a ratio between widths on the basis of a reference model. Comparative Example 1 is an example of making thicknesses of a cathode tab and an anode tab equal to those of a reference pouch type secondary battery, and Comparative Example 2 is an example of increasing thicknesses of a cathode tab and an anode tab in order to decrease an internal resistance. Embodiment Example 1 is an example of installing two electrode tabs at each of both ends, and Embodiment Example 2 is an example of increasing widths of electrode tabs in order to increase cross-sectional areas of the electrode tabs.

TABLE 1

| | | Unit | Reference | Comparative Example 1 | Comparative Example 2 | Embodiment Example 1 | Embodiment Example 2 |
|---|---|---|---|---|---|---|---|
| Battery Cell | Width (Wc) | mm | 530 | 800 | 800 | 800 | 800 |
| | Height (Hc) | mm | 100 | 100 | 100 | 100 | 100 |
| Electrode Tab | Number | | 1 | 1 | 1 | 2 | 2 |
| | Width (Wt) | mm | 45 | 45 | 45 | 22.5 | 27.6 |
| | | | | | | 22.5 | 27.6 |
| | Thickness (t1) of Cathode Tab | mm | 0.4 | 0.4 | 1 | 1 | 1 |
| | Thickness (t2) of Anode Tab | mm | 0.2 | 0.2 | 0.6 | 0.6 | 0.6 |
| Internal Resistance | | mΩ | 0.88 | 1.32 | 1.27 | 0.89 | 0.89 |
| Internal Resistance Difference | | mΩ | — | 0.44 | 0.39 | 0.01 | 0.01 |

As compared with the reference pouch type secondary battery, in Comparative Example 1, a width of a battery cell was increased, such that an internal resistance was increased by 0.44 mΩ, and in Comparative Example 2, even though thicknesses of a cathode tab and an anode tab were increased in order to decrease an internal resistance, the internal resistance was still increased by 0.39 mΩ. On the other hand, in Embodiment Example 1 in which two electrode tabs are installed at each of both ends, an increase amount in an internal resistance was 0.1 mΩ, which does not have a significant difference from an increase amount in an internal resistance of the reference model, and in Embodiment Example 2 in which widths of electrode tabs are increased, an increase amount in an internal resistance did not have a significant difference from an increase amount in an internal resistance of Embodiment Example 1. Therefore, it may be seen that the most effective method of decreasing the internal resistance is to make the number of electrode tabs two or more and increase the thicknesses of the electrode tabs.

Figure 6:
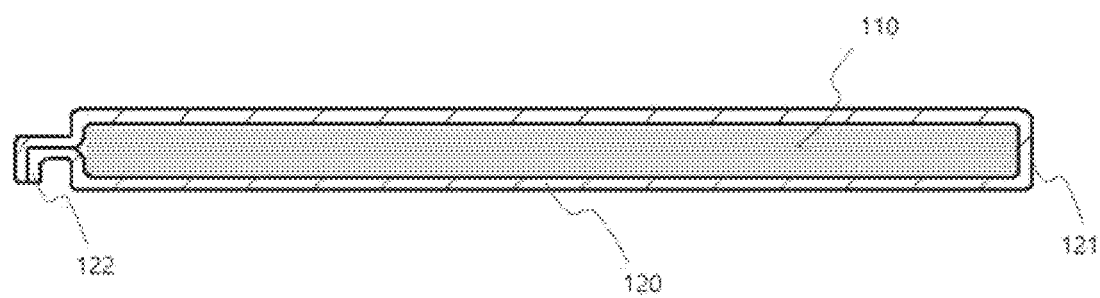
FIG. 6 is a cross-sectional view taken along line X-X' of FIG. 2.

In addition, since a width of the battery cell 100 is increased, it is necessary to improve cooling efficiency of the battery cell 100. To this end, the present invention proposes a method in which the pouch 120 surrounds the electrode assembly 110 on three sides. FIG. 6 is a cross-sectional view taken along line X-X' of FIG. 2. Referring to FIG. 6, the pouch 120 according to the present invention surrounds the electrode assembly 110 in which the cathode plate, the anode plate, and the separator are stacked, a bent portion 121 surrounding the electrode assembly 110 is formed at one edge of the pouch, and a sealing portion is formed at the other edge of the pouch by bonding both ends of the pouch to each other. That is, the sealing portion 122 of the pouch is formed at only one edge of the pouch, such that three sides surround the electrode assembly 110 in a plane shape without having sealing portions, and an area at which a separate cooling member comes into surface-contact with the electrode assembly 110 may be increased to improve cooling efficiency.

According to the configuration as described above, the pouch type secondary battery according to the present invention may implement maximum space efficiency and an optimal energy density, and may be loaded into the vehicle.

In addition, in the pouch type secondary battery according to the present invention, the superwide width capable of corresponding to the width of the vehicle is implemented, such that the number of components of the battery pack may be decreased, productivity may be improved, a cost may be decreased, and an energy density may be improved using a superwide electrode assembly.

Further, the superwide width may be implemented without increasing the internal resistance by suggesting implementing method to multiple electrode tabs in relatively short edge, and even though the number and thicknesses of electrode tabs are increased, sealing performance at the connected portions may be improved.

In addition, the sealing portion of the pouch is formed at one edge of the pouch to increase the area at which the separate cooling member comes into surface-contact with the electrode assembly, such that the cooling efficiency may be improved.

The technical spirit of the present invention is not to be construed as being limited to the exemplary embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

[Detailed Description of Main Elements]

1000: pouch type secondary battery according to the present invention

[Detailed Description of Main Elements]

| | |
|---|---|
| 100: battery cell | |
| 110: electrode assembly | |
| 120: pouch | |
| 121: bent portion | 122: sealing portion |
| 130: connected portion | |
| 131: cathode tab sealing film | 132: anode tab sealing film |
| 200: electrode tab | |
| 210: cathode tab | 211: cathode tab edge |
| 220: anode tab | 221: anode tab edge |

What is claimed is:

1. A pouch type secondary battery comprising:
an electrode assembly including a cathode plate, an anode plate, and a separator;
a pouch surrounding the electrode assembly; and electrode tabs connected to both ends of the electrode assembly and protruding outward of the pouch,
wherein the electrode tabs connected to the both ends of the electrode assembly include two or more pairs of a cathode tabs and an anode tabs, respectively,
Wc/Hc>4 in which Hc is a length of a battery cell at edges in a first direction of the battery cell to which the electrode tabs are connected and Wc is a length of the battery cell at edges in a second direction of the battery cell except for protrusion lengths of the electrode tabs, the second direction being perpendicular to the first direction, and,
wherein at least one cathode tab and at least one anode tab are positioned on each side.

2. The pouch type secondary battery of claim 1, wherein Wtg/Hc>0.1 in which Wtg is a distance between the cathode tab and the anode tab.

3. The pouch type secondary battery of claim 1, wherein Wc/Hc>5.

4. The pouch type secondary battery of claim 1, wherein Wc/Hc>7.

5. The pouch type secondary battery of claim 2, wherein 0.3<(Wt1+Wt2)/Hc<0.6 in which Wt1 is a width of the cathode tab and Wt2 is a width of the anode tab.

6. The pouch type secondary battery of claim 1, wherein a thickness of the cathode tab is larger than a thickness of the anode tab.

7. The pouch type secondary battery of claim 6, wherein the length of the battery cell at the edge of the second direction is 300 mm or more,
the length of the battery cell at the edge of the first direction is 70 mm or more, and
0.3 mm<t1<1.5 mm and 1.0<t1/t2<2.0 in which t1 is a thickness of the cathode tab and t2 is a thickness of the anode tab.

* * * * *